US012771513B2

(12) United States Patent
Huang et al.

(10) Patent No.: US 12,771,513 B2
(45) Date of Patent: Oct. 20, 2026

(54) DATA ACKNOWLEDGMENT METHOD AND APPARATUS

(71) Applicant: HUAWEI TECHNOLOGIES CO., LTD., Shenzhen (CN)

(72) Inventors: Guogang Huang, Shenzhen (CN); Yunbo Li, Shenzhen (CN); Yuchen Guo, Shenzhen (CN); Dandan Liang, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 18/812,587

(22) Filed: Aug. 22, 2024

(65) Prior Publication Data

US 2025/0055649 A1 Feb. 13, 2025

Related U.S. Application Data

(63) Continuation of application No. 18/168,850, filed on Feb. 14, 2023, now abandoned, which is a (Continued)

(30) Foreign Application Priority Data

Mar. 7, 2018 (CN) ........................ 201810187153.X

(51) Int. Cl.
*H04L 5/00* (2006.01)

(52) U.S. Cl.
CPC .................................. *H04L 5/0055* (2013.01)

(58) Field of Classification Search
CPC ... H04L 5/0055; H04L 1/1854; H04L 1/1864; H04L 1/1685; H04L 1/1607

(Continued)

(56) References Cited

U.S. PATENT DOCUMENTS

| | | | |
|---|---|---|---|
| 2002/0039904 A1 | 4/2002 | Anderson | |
| 2007/0207812 A1 | 9/2007 | Borran et al. | |

(Continued)

FOREIGN PATENT DOCUMENTS

| | | |
|---|---|---|
| CN | 103118366 A | 5/2013 |
| CN | 103731809 A | 4/2014 |

(Continued)

OTHER PUBLICATIONS

International Search Report issued in corresponding International Application No. PCT/CN2019/072321, mailed Mar. 27, 2019, State Intellectual Property Office of the P.R. China, Beijing, China.

(Continued)

*Primary Examiner* — Mang Hang Yeung
(74) *Attorney, Agent, or Firm* — HAUPTMAN HAM, LLP

(57) ABSTRACT

A station-side data acknowledgment apparatus includes a transmitter configured to send a data frame to access points (APs), and to send an acknowledgment request, a processor configured to control the transmitter to send the acknowledgment request after a duration from an end of sending the data frame to the APs, and a receiver configured to receive a beacon. The duration is greater than or equal to a transmission delay on a backhaul link between the APs. The acknowledgment request is for the data frame. The beacon includes a media access control (MAC) address of an AP or a virtual coordinated AP to which the AP belongs, and the transmission delay. The indication information includes a receiver address field whose value is a MAC address of a virtual coordinated AP and is in the data frame, or a 1-bit uplink joint reception indicator bit in the data frame.

13 Claims, 7 Drawing Sheets

Related U.S. Application Data continuation of application No. 17/014,469, filed on Sep. 8, 2020, now abandoned, which is a continuation of application No. PCT/CN2019/072321, filed on Jan. 18, 2019.

(58) Field of Classification Search
USPC .......................................................... 370/329
See application file for complete search history.

(56) References Cited

U.S. PATENT DOCUMENTS

| | | | | |
|---|---|---|---|---|
| 2010/0008337 | A1* | 1/2010 | Bajko | H04W 4/029 370/338 |
| 2015/0063258 | A1 | 3/2015 | Merlin et al. | |
| 2017/0055255 | A1* | 2/2017 | Zhou | H04L 5/0055 |

FOREIGN PATENT DOCUMENTS

| | | | |
|---|---|---|---|
| CN | 104717760 | A | 6/2015 |
| CN | 105813075 | A | 7/2016 |
| CN | 106102183 | A | 11/2016 |
| CN | 106656429 | A | 5/2017 |
| CN | 106716901 | A | 5/2017 |
| CN | 107040356 | A | 8/2017 |
| CN | 107623931 | A | 1/2018 |
| CN | 109672512 | A | 4/2019 |
| CN | 110247738 | B | 10/2022 |
| EP | 3185452 | A1 | 6/2017 |
| WO | 2014066785 | A1 | 5/2014 |
| WO | 2017030698 | A1 | 2/2017 |

OTHER PUBLICATIONS

European Search Report issued in corresponding European Application No. 19763352.2, dated Mar. 18, 2021, pp. 1-10, European Patent Office, Munich, Germany.
Chinese Office Action issued in corresponding Chinese Application No. 201810187153.X, dated Jul. 26, 2021, pp. 1-10, Beijing, China.
Chinese Office Action issued in corresponding Chinese Application No. 201810187153.X, dated Jan. 18, 2022, pp. 1-12.
Fakhar Uddin Ahemd; Shikhar Kr. Sarma, "QoS and Admission Controller in IEEE 802.11e WLAN," 2013 4th International Conference on Intelligent Systems, Modelling and Simulation, 2013, 4 pages.
Chen xing, Research on IEEE 802.21-Based Heterogeneous Multi-Hop Networks, 2 pages (abstract).
European Office Action issued in corresponding European Application No. 19763352.2, dated Feb. 21, 2023, pp. 1-5.

* cited by examiner

DATA ACKNOWLEDGMENT METHOD AND APPARATUS

CROSS-REFERENCE TO RELATED APPLICATIONS

This application is a continuation of U.S. patent application Ser. No. 18/168,850, filed on Feb. 14, 2023, which is a continuation of U.S. patent application Ser. No. 17/014,469, filed on Sep. 8, 2020, which is a continuation of International Application No. PCT/CN2019/072321, filed on Jan. 18, 2019. The International Application claims priority to Chinese Patent Application No. 201810187153.X, filed on Mar. 7, 2018. All of the afore-mentioned patent applications are hereby incorporated by reference in their entireties.

TECHNICAL FIELD

Embodiments of this application relate to the communications field, and in particular, to a data acknowledgment method and apparatus in the communications field.

BACKGROUND

In an outdoor scenario such as a high-speed railway or a highway, power of a station (STA) is relatively low relative to that of an access point (AP). Therefore, a STA cannot correctly send uplink data to an AP that belongs to the STA. In this case, a plurality of APs simultaneously receive uplink data sent by the STA, and perform sharing acknowledgment on the received uplink data, thereby improving transmission accuracy and transmission efficiency of the uplink data.

Data is transmitted by using an air interface in a wireless local area network (WLAN). The data may not to be successively received by a receiver due to interference and a poor channel condition. To determine whether the data is successfully received by the receiver, an acknowledgment mechanism is introduced into the 802.11 standard.

Therefore, in the foregoing communication scenario, how to acknowledge received data during uplink joint reception is a problem urgently to be resolved.

SUMMARY

Embodiments of this application provide a data acknowledgment method and apparatus, so that AP-side uplink data joint reception is completed without wasting air interface resources.

According to a first aspect, an embodiment of this application provides a data acknowledgment method, including:

sending, by a STA, a data frame; and sending, by the STA, an acknowledgment request after X duration from end of sending the data frame, where the X duration is greater than or equal to a transmission delay on a backhaul link between APs, and the acknowledgment request is an acknowledgment request for the data frame.

In some embodiments, the STA first sends the data frame, and then sends the acknowledgment request after the X duration from the end of sending the data frame. The X duration is greater than or equal to the transmission delay on the backhaul link between the APs.

After sending the data frame, the STA reserves at least the duration (the transmission delay on the backhaul link between the APs), and then sends the acknowledgment request, so that an AP 1 and an AP 2 have enough time to perform data acknowledgment. Therefore, the AP 1 or the AP 2 can reply to the acknowledgment request sent by the STA. In this way, AP-side uplink joint reception is completed without introducing data padding and wasting air interface resources.

In some embodiments of the first aspect, the data frame carries indication information used to indicate uplink joint reception.

In some embodiments of the first aspect, the indication information includes an RA field whose value is a MAC address of a virtual coordinated AP and that is in the data frame, or a 1-bit uplink joint reception indicator bit in the data frame.

In some embodiments of the first aspect, before the sending, by a STA, a data frame, the method further includes: receiving, by the STA, a beacon, where the beacon includes a MAC address of an AP, a MAC address of a virtual coordinated AP to which the AP belongs, and the transmission delay on the backhaul link between the APs.

According to a second aspect, an embodiment of this application provides a data acknowledgment method, including:

receiving, by an AP, a data frame; and receiving, by the AP, an acknowledgment request after X duration from end of receiving the data frame, where the X duration is greater than or equal to a transmission delay on a backhaul link between APs, and the acknowledgment request is an acknowledgment request for the data frame.

It should be understood that a plurality of APs separately receive the data frame, and an AP 1 and an AP 2 perform data acknowledgment within the X duration from the end of receiving the data frame, to reply to the acknowledgment request sent by the STA after the X duration from the end of sending the data frame. The X duration is greater than or equal to the transmission delay on the backhaul link between the APs. The acknowledgment request is an acknowledgment request for the data frame.

In this embodiment of this application, AP-side uplink joint reception is completed without introducing data padding and wasting air interface resources.

In some embodiments of the second aspect, after the receiving, by an AP, an acknowledgment request, the method further includes: replying, by the AP, to the acknowledgment request.

In some embodiments of the second aspect, the data frame carries indication information used to indicate uplink joint reception.

In some embodiments of the second aspect, a possible implementation is that the indication information includes an RA field whose value is a MAC address of a virtual coordinated AP and that is in the data frame, or a 1-bit uplink joint reception indicator bit in the data frame.

In some embodiments of the second aspect, before the receiving, by an AP, a data frame, the method further includes: sending, by the AP, a beacon, where the beacon includes a MAC address of the AP, a MAC address of a virtual coordinated AP to which the AP belongs, and the transmission delay on the backhaul link between the APs.

According to a third aspect, an embodiment of this application provides a STA-side data acknowledgment apparatus, including:

a sending module, configured to send a data frame, where the sending module is further configured to send an acknowledgment request; and a processing module, configured to control the sending module to send the acknowledgment request after X duration from end of sending the data frame, where the X duration is greater than or equal to a transmission delay on a backhaul link between APs, and the acknowledgment request is an acknowledgment request for the data frame. In some embodiments of the third aspect, the data frame carries indication information used to indicate uplink joint reception.

In some embodiments of the third aspect, a possible implementation is that the indication information includes an RA field whose value is a MAC address of a virtual coordinated AP and that is in the data frame, or a 1-bit uplink joint reception indicator bit in the data frame.

In some embodiments of the third aspect, the STA-side data acknowledgment apparatus further includes: a receiving module, configured to receive a beacon, where the beacon includes a MAC address of an AP, a MAC address of a virtual coordinated AP to which the AP belongs, and the transmission delay on the backhaul link between the APs.

Based on the STA-side data acknowledgment apparatus in this embodiment of this application, AP-side uplink joint reception can be completed without introducing data padding and wasting air interface resources.

According to a fourth aspect, an embodiment of this application provides an AP-side data acknowledgment apparatus, including:

a receiving module, configured to receive a data frame, where the receiving module is further configured to receive an acknowledgment request; and a processing module, configured to control the receiving module to receive the acknowledgment request after X duration from end of receiving the data frame, where the X duration is greater than or equal to a transmission delay on a backhaul link between APs, and the acknowledgment request is an acknowledgment request for the data frame.

In some embodiments of the fourth aspect, the AP-side data acknowledgment apparatus further includes: a sending module, configured to reply to the acknowledgment request.

In some embodiments of the fourth aspect, the data frame carries indication information used to indicate uplink joint reception.

In some embodiments of the fourth aspect, a possible implementation is that the indication information includes an RA field whose value is a MAC address of a virtual coordinated AP and that is in the data frame, or a 1-bit uplink joint reception indicator bit in the data frame.

In some embodiments of the fourth aspect, the sending module is further configured to send a beacon, where the beacon includes a MAC address of an AP, a MAC address of a virtual coordinated AP to which the AP belongs, and the transmission delay on the backhaul link between the APs.

According to a fifth aspect, an embodiment of this application provides a STA-side data acknowledgment device. The data acknowledgment device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. When the processor executes the instruction stored in the memory, the processor in the data acknowledgment device is enabled to perform the method in the first aspect or any possible implementation of the first aspect.

According to a sixth aspect, an embodiment of this application provides an AP-side data acknowledgment device. The data acknowledgment device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. When the processor executes the instruction stored in the memory, the processor in the data acknowledgment device is enabled to perform the method in the second aspect or any possible implementation of the second aspect.

According to a seventh aspect, an embodiment of this application provides a computer readable medium, configured to store a computer program. The computer program includes an instruction used to perform the method in the first aspect or any possible implementation of the first aspect.

According to an eighth aspect, an embodiment of this application provides a computer readable medium, configured to store a computer program. The computer program includes an instruction used to perform the method in the second aspect or any possible implementation of the second aspect.

According to a ninth aspect, an embodiment of this application provides a computer program. The computer program includes an instruction used to perform the method in the first aspect or any possible implementation of the first aspect.

According to a tenth aspect, an embodiment of this application provides a computer program. The computer program includes an instruction used to perform the method in the second aspect or any possible implementation of the second aspect.

According to an eleventh aspect, an embodiment of this application provides a chip. The chip includes a processing circuit and a transceiver pin. The transceiver pin and the processor communicate with each other by using an internal connection. The processor performs the method in the first aspect or any possible implementation of the first aspect, to control a receive pin to receive a signal and control a transmit pin to send a signal.

According to a twelfth aspect, an embodiment of this application provides a chip. The chip includes a processing circuit and a transceiver pin. The transceiver pin and the processor communicate with each other by using an internal connection. The processor performs the method in the second aspect or any possible implementation of the second aspect, to control a receive pin to receive a signal and control a transmit pin to send a signal.

In the embodiments of this application, the STA sends the acknowledgment request after the X duration from the end of sending the data frame. The X duration is greater than or equal to the transmission delay on the backhaul link between the APs, so that acknowledgment of AP-side uplink joint reception is completed without wasting air interface resources.

DETAILED DESCRIPTION

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. The following describes the technical solutions in the embodiments of this application with reference to the accompanying drawings in the embodiments of this application.

It should be understood that, the technical solutions of the embodiments of this application may be applied to various communications systems, for example, a Wi-Fi wireless communications system, a global system for mobile communications (global system of mobile communication (GSM) system, a code division multiple access (CDMA) system, a wideband code division multiple access (WCDMA) system, a general packet radio service (GPRS) system, a long term evolution (LTE) system, a universal mobile telecommunications system (UMTS) system, a worldwide interoperability for microwave access (WiMAX) communications system, a future 5G communication system, another radio communications system that adopts radio access technology, and the like.

Figure 1:
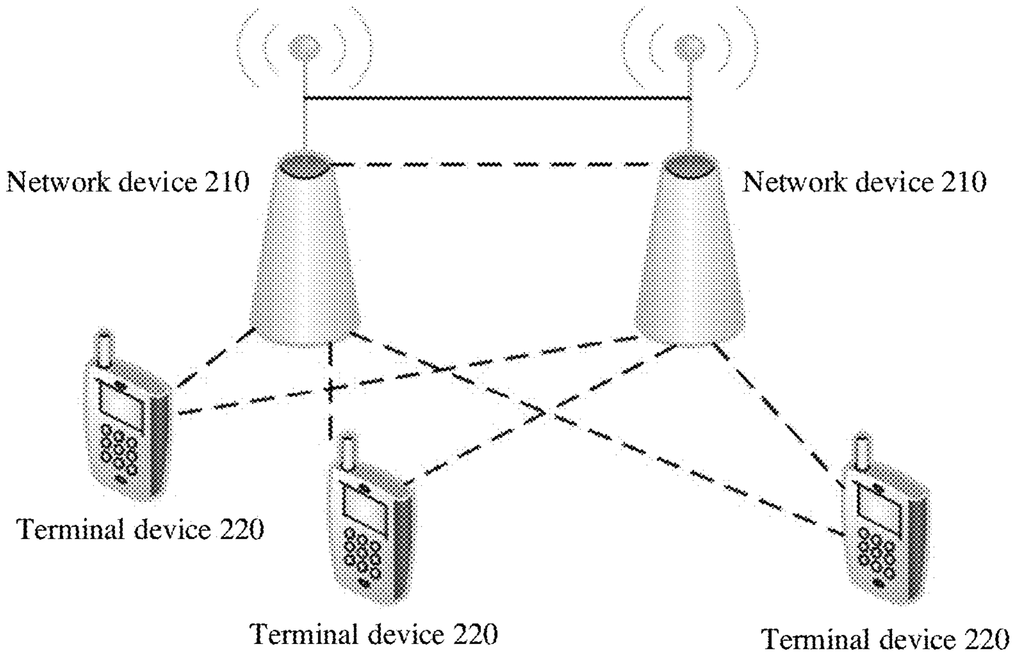
FIG. 1 shows a communications system to which the embodiments of this application are applied.

FIG. 1 shows a communications system 200 to which the embodiments of this application are applied. The communications system includes at least two network devices 210. The at least two network devices 210 may communicate with each other. The network device 210 may be a device that communicates with a terminal device, for example, a base station, a base station controller, or an access point. Each network device 210 may provide communication coverage for a particular geographic area, and may communicate with a terminal device (for example, UE) located in the coverage area (a cell). The network device 210 may be a base transceiver station (base transceiver station (BTS) in a GSM system or a CDMA system, a nodeB (NB) in a WCDMA system, an evolved nodeB (eNB or eNodeB) in an LTE system, or a radio controller in a cloud radio access network (CRAN). Alternatively, the network device may be an access point in a Wi-Fi wireless communications system, or the network device may be a relay station, a vehicle-mounted device, a wearable device, a network side device in a future 5G network, a network device in a future evolved public land mobile network (PLMN), or the like.

The wireless communications system 200 further includes at least one terminal device 220 within a coverage range of the network device 210. The terminal device 220 may be mobile or fixed. The access terminal 220 may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved PLMN.

FIG. 1 shows an example of two network devices and three terminal devices. In some embodiments, the communications system 200 may include a plurality of network devices, and another quantity of terminal devices may be included in a coverage range of each network device. This is not limited in this embodiment of this application.

The following describes the method and the product in the embodiments of this application by using an example in which the network device is an access point in a Wi-Fi wireless communications system and the terminal device is a station in the Wi-Fi wireless communications system. However, it should be understood that the method and the product in the embodiments of this application are not limited to the access point and the station in the Wi-Fi wireless communications system. The method and the product in the embodiments of this application are applicable to various communication scenarios in which the method in the embodiments of this application can be used.

An access point (Access point) in a Wi-Fi wireless communications system is referred to as an AP for short, and a station (Station) in a Wi-Fi wireless communications system is referred to as a STA for short.

Figure 2:
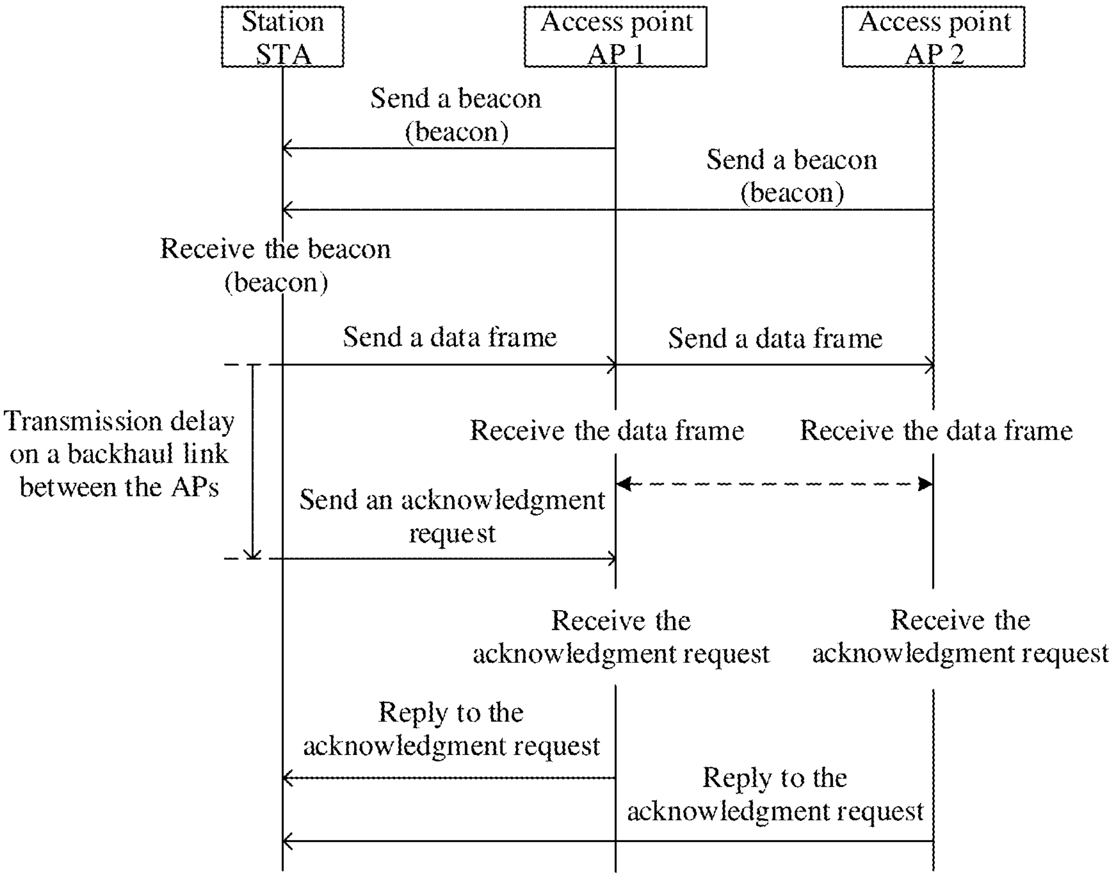
FIG. 2 is a flowchart of a method according to some embodiments of this application.

FIG. 2 is a flowchart of a method according to an embodiment of this application. FIG. 2 shows an example of two APs and one STA. However, it should be understood that the method in this embodiment of this application is applicable to a communications system including a plurality of APs and a plurality of STAs. This is not limited in this embodiment of this application.

As shown in FIG. 2, the data acknowledgment method includes the following steps:

S301. An AP 1 sends a beacon, where the beacon includes a medium access control (MAC) address of the AP 1, a MAC address of a virtual coordinated AP to which the AP 1 belongs, and a transmission delay on a backhaul link between APs.

S301. An AP 2 sends a beacon, where the beacon includes a MAC address of the AP 2, a MAC address of a virtual coordinated AP to which the AP 2 belongs, and a transmission delay on a backhaul link between APs.

In S301, the AP 1/AP 2 may send the beacon in a broadcast manner. The APs may respectively send the beacons, or may simultaneously send the beacons. The APs simultaneously send the beacons, to increase a probability that an edge STA in a coverage area of the virtual coordinated AP correctly receives the beacon.

Figure 3:
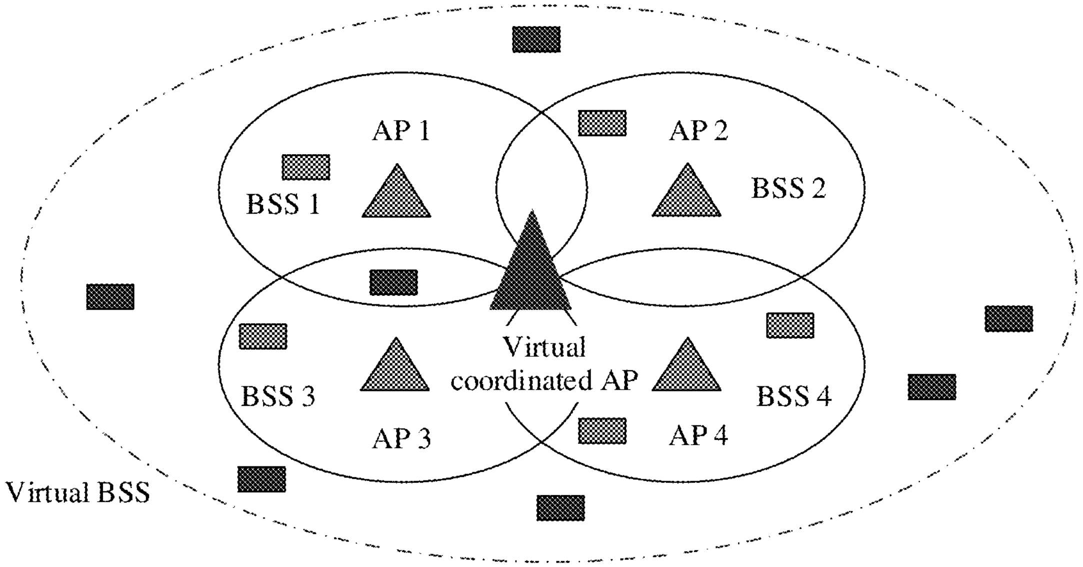
FIG. 3 shows a relationship between a virtual coordinated AP and a member AP according to some embodiments of this application.

As shown in FIG. 3, a relationship between a virtual coordinated AP and a member AP is as follows: defining a virtual coordinated AP, allocating a virtual MAC address to the virtual coordinated AP, and configuring a member AP for the virtual coordinated AP. For example, as shown in FIG. 3, an AP 1, an AP 2, an AP 3, and an AP 4 are member APs of the virtual coordinated AP. In other words, the AP 1, the AP 2, the AP 3, and the AP 4 belong to the same virtual coordinated AP.

S302. A STA receives the beacons.

In S302, the STA receives the beacon sent by the AP 1, and the STA receives the beacon sent by the AP 2. In this way, the STA obtains the MAC address of the AP 1, the MAC address of the virtual coordinated AP to which the AP 1 belongs, the MAC address of the AP 2, the MAC address of the virtual coordinated AP to which the AP 2 belongs, and the transmission delay on the backhaul link between the APs. Therefore, the STA can obtain a belonging relationship between each AP and the virtual coordinated AP. For example, if the MAC address of the virtual coordinated AP to which the AP 1 belongs is the same as the MAC address of the virtual coordinated AP to which the AP 2 belongs, the AP 1 and the AP 2 are member APs of the same virtual coordinated AP.

S303. The STA sends a data frame, where the data frame carries indication information used to indicate uplink joint reception.

In step S303, the STA sends the data frame to the AP 1 and the AP 2. For example, the STA sends the data frame to the AP 1 and the AP 2 in a broadcast manner. Certainly, a sending manner of the STA is not limited in this embodiment of this application, as long as the STA can send the data frame to the AP 1 and the AP 2.

In step S303, the STA sends the data frame after receiving the beacons. The data frame includes indication information used to indicate whether the AP 1 and the AP 2 need to jointly receive the data frame. The indication information includes an RA field whose value is a MAC address of a virtual coordinated AP and that is in the data frame, or a 1-bit uplink joint reception indication bit in the data frame.

S304. The AP 1 receives the data frame.

S304. The AP 2 receives the data frame.

In step S304, the AP 1 and the AP 2 determine based on the indication information in the received data frame whether to receive the data frame. If the value of the RA field in the data frame is a MAC address of a virtual coordinated AP, the AP 1 determines whether the MAC address of the virtual coordinated AP is the MAC address of the virtual coordinated AP to which the AP 1 belongs. If the MAC address of the virtual coordinated AP is the MAC address of the virtual coordinated AP to which the AP 1 belongs, the AP 1 receives the data frame. A case of the AP 2 is similar to that of the AP 1. Details are not described herein again.

If the data frame includes the 1-bit uplink joint reception indication bit, the AP determines according to an uplink joint reception policy of the AP whether to receive the data frame. If the uplink joint reception policy of the AP is to receive the data frame, the AP 1 receives the data frame. A case of the AP 2 is similar to that of the AP 1. Details are not described herein again.

S305. The AP 1 and the AP 2 perform data acknowledgment.

In step 305, a time required for the data acknowledgment performed by the AP 1 and the AP 2 is the transmission delay on the backhaul link between the APs.

S306. The STA sends an acknowledgment request after X duration from end of sending the data frame, where the X duration is greater than or equal to the transmission delay on the backhaul link between the APs, and the acknowledgment request is an acknowledgment request for the data frame.

In step S306, the STA sends the acknowledgment request after the X duration from the end of sending the data frame in step S303. The X duration is greater than or equal to the transmission delay on the backhaul link between the APs. The acknowledgment request is an acknowledgment request for the data frame. In other words, the STA reserves duration of the transmission delay on the backhaul link between the APs. Therefore, the AP 1 and the AP 2 perform data acknowledgment, and the AP 1 or the AP 2 can reply to the acknowledgment request sent by the STA.

S307. The AP 1 replies to the acknowledgment request.

S307. The AP 2 replies to the acknowledgment request.

In S307, it should be understood that both the AP 1 and the AP 2 may reply to the acknowledgment request, or only the AP 1 or only the AP 2 may reply to the acknowledgment request. This is not limited in this embodiment of this application.

In S307, if the STA continuously sends data frames, the AP performs the following determining when replying to the acknowledgment request: If duration between receiving the data frame by the AP 1 and receiving the acknowledgment request by the AP 1 is greater than or equal to the transmission delay on the backhaul link between the APs, the AP 1 replies to the reception status of the data frame; or if duration between receiving the data frame by the AP 1 and receiving the acknowledgment request by the AP 1 is less than the transmission delay on the backhaul link between the APs, the AP 1 does not reply to a reception status of the data frame.

Figure 4:
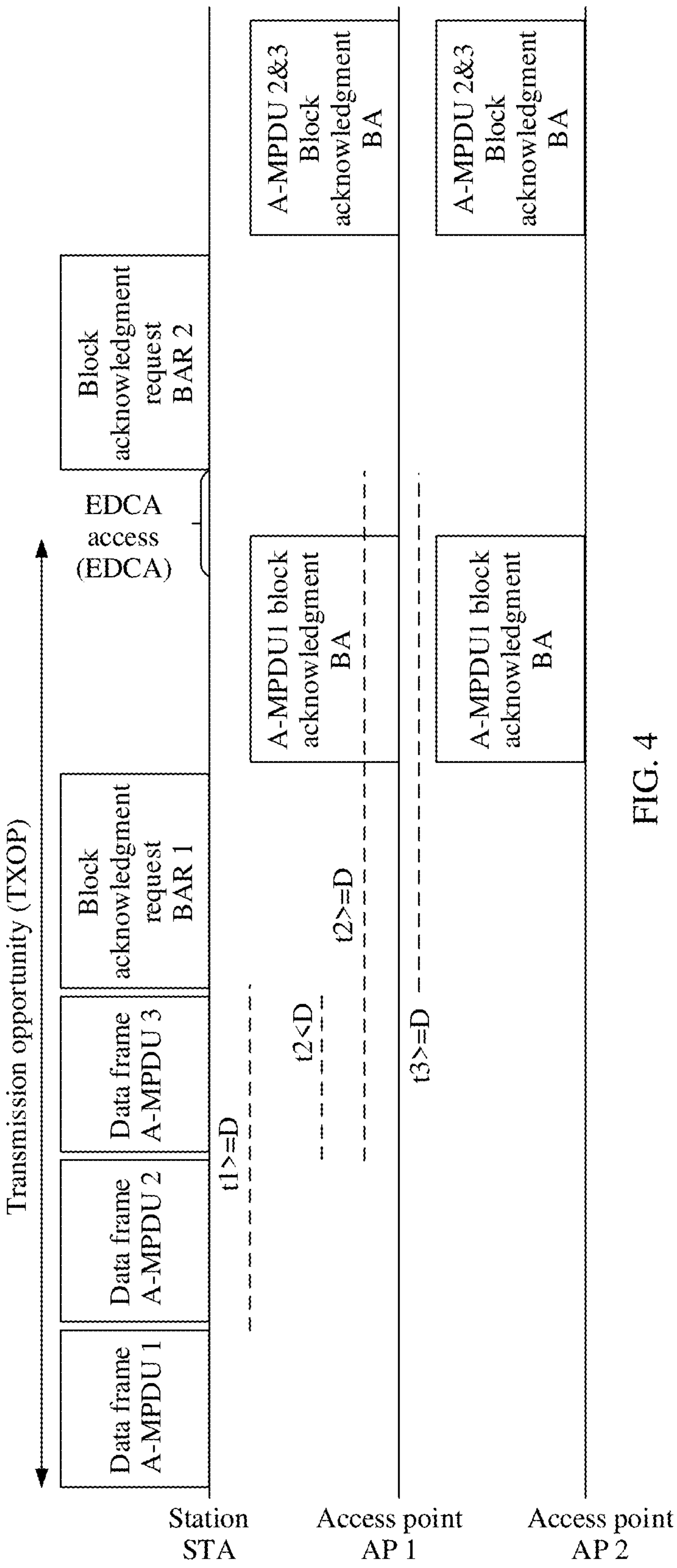
FIG. 4 is a schematic diagram of a method according to some embodiments of this application.

For example, as shown in FIG. 4, the STA continuously sends data frames A-MAC protocol data unit 1 (A-MPDU 1), A-MPDU 2, and A-MPDU 3. The STA sends a block acknowledgment request (BAR) 1 after sending the data frame A-MPDU 3. The AP 1 performing the following determining when replying to the block acknowledgment request BAR:

If duration between receiving the data frame A-MPDU 1 by the AP 1 and receiving the block acknowledgment request BAR 1 by the AP 1 is greater than or equal to the transmission delay on the backhaul link between the APs, the AP 1 replies to a reception status of the data frame A-MPDU 1.

If duration between receiving the data frame A-MPDU 2 by the AP 1 and receiving the block acknowledgment request BAR 1 by the AP 1 is less than the transmission delay on the backhaul link between the APs, the AP 1 does not reply to a reception status of the data frame A-MPDU 2.

If duration between receiving the data frame A-MPDU 3 by the AP 1 and receiving the block acknowledgment request BAR 1 by the AP 1 is less than the transmission delay on the backhaul link between the APs, the AP 1 does not reply to a reception status of the data frame A-MPDU 3.

The AP 1 has not replied to the reception statuses of the data frame A-MPDU 2 and the data frame A-MPDU 3. Then, the STA contends for a channel again, and sends a block acknowledgment request BAR 2. The AP 1 performs the following determining when replying to the block acknowledgment request BAR 2:

If duration between receiving the data frame A-MPDU 2 by the AP 1 and receiving the block acknowledgment request BAR 2 by the AP 1 is greater than or equal to the transmission delay on the backhaul link between the APs, the AP 1 replies to the reception status of the data frame A-MPDU 2.

If duration between receiving the data frame A-MPDU 3 by the AP 1 and receiving the block acknowledgment request BAR 2 by the AP 1 is greater than or equal to the transmission delay on the backhaul link between the APs, the AP 1 replies to the reception status of the data frame A-MPDU 3.

In the method in this embodiment of this application, the STA sends the acknowledgment request after the X duration from the end of sending the data frame (herein, the X duration is greater than or equal to the transmission delay on the backhaul link between the APs), to complete AP-side uplink joint reception without introducing data padding and wasting air interface resources.

Figure 5:
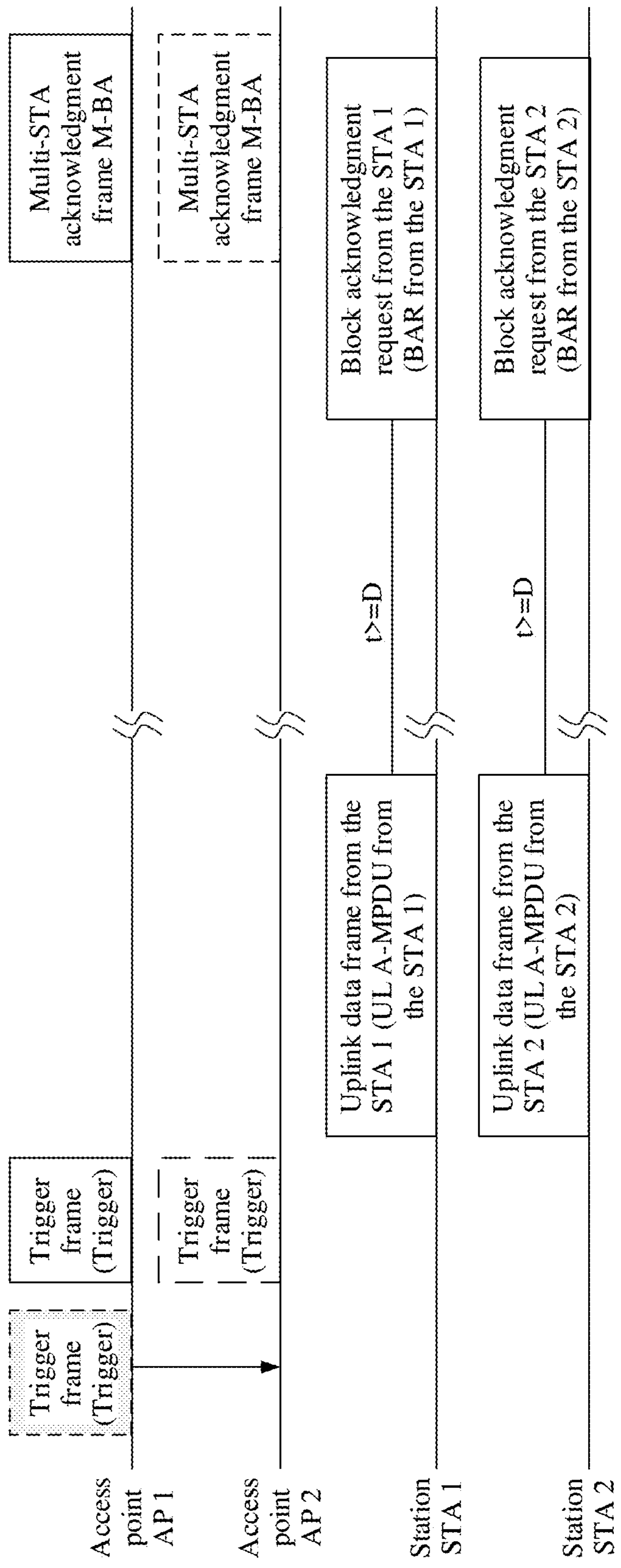
FIG. 5 is a schematic diagram of another method according to some embodiments of this application.

The method in this embodiment of this application is not limited to a single STA. The method in this embodiment of this application may be further applied to a multi-STA multi-AP communication scenario. For example, FIG. 5 is a schematic flowchart of a method in a multi-STA multi-AP communication scenario according to an embodiment of this application. Herein, a trigger frame is used to allocate resources to a STA 1 and a STA 2 for sending uplink data frames A-MPDU. It should be understood that the trigger may be sent by an AP 1, or may be sent by an AP 2, or may be sent by both an AP 1 and an AP 2. In FIG. 5, the AP 1 and the AP 2 both send the triggers. In FIG. 5, as a primary AP, the AP 1 transmits the trigger to another coordinated member AP such as the AP 2 by using a backhaul link. The AP 1 sends the trigger to request the STA 1 and the STA 2 to send uplink data to the AP 1. In addition, the AP 2 sends a trigger to request the STA 1 and the STA 2 to send uplink data to the AP 2. The STA 1 separately sends a data frame A-MPDU to the AP 1 and the AP 2 based on resource allocation indication information in the trigger. The STA 1 sends an acknowledgment request after X duration from end of sending the data frame A-MPDU. The X duration is greater than or equal to a transmission delay on a backhaul link between APs. The acknowledgment request is an acknowledgment request for the data frame A-MPDU. The STA 2 performs same actions as the STA 1. Details are not described herein again. The AP 1 and the AP 2 perform data acknowledgment on the data frame A-MPDU sent by the STA 1. The AP 1 replies, based on a reception status of the data frame sent by the STA 1, to the acknowledgment request sent by the STA 1. The AP 1 replies, based on a reception status of the data frame sent by the STA 2, to the acknowledgment request sent by the STA 2. The AP 1 may send a multi-STA acknowledgment frame (M-BA) to reply to both the acknowledgment requests sent by the STA 1 and the STA 2. The AP 2 performs same actions as the AP 1. Details are not described herein again. It should be understood that both the AP 1 and the AP 2 may reply to the acknowledgment request, or only the AP 1 or only the AP 2 may reply to the acknowledgment request. This is not limited in this embodiment of this application.

In the foregoing embodiment of this application, the STA sends the acknowledgment request after the X duration from the end of sending the data frame, and the AP 1 or the AP 2 replies to the acknowledgment request based on an AP-side uplink joint reception result. It should be understood that the AP 1 or the AP 2 may directly send an AP-side uplink joint reception status to the STA based on the AP-side uplink joint reception result instead of based on the acknowledgment request sent by the STA. In this acknowledgment mechanism, if the STA does not receive, within a time D from the end of sending the data frame, the AP-side uplink joint reception result that is sent by the AP side, the STA retransmits the data frame. Herein, D is a time value that may be defined as a maximum transmission delay on the backhaul link between the APs, or may be defined as a sum of a guard period and a maximum transmission delay on the backhaul link between the APs.

Figure 6:
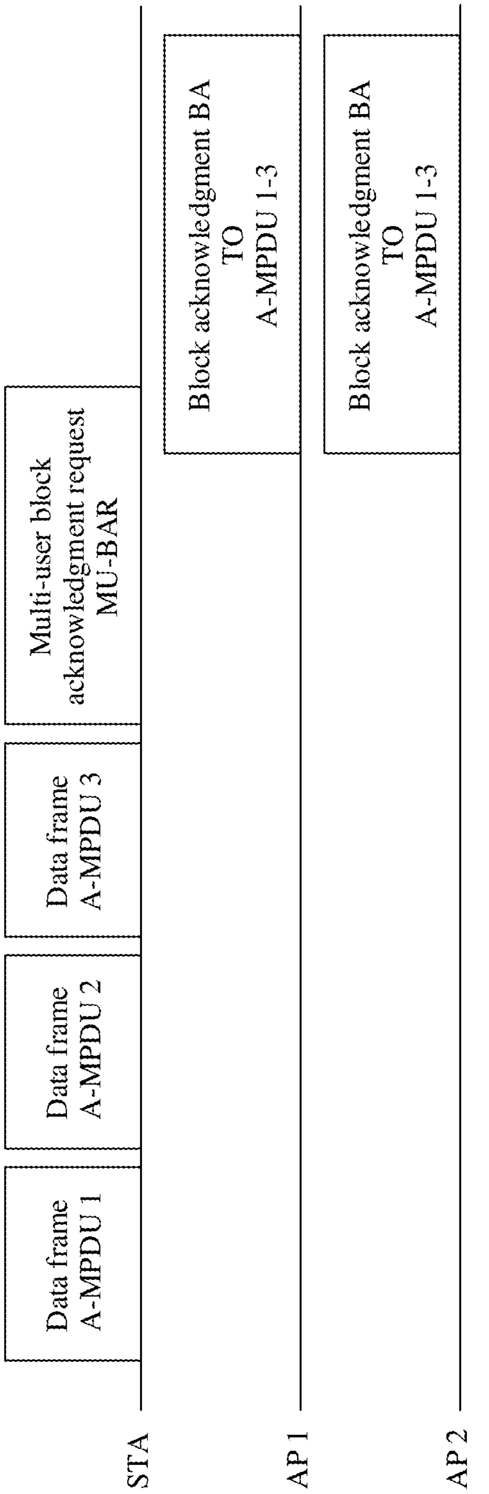
FIG. 6 is a schematic diagram of another method according to some embodiments of this application.

In another embodiment of this application, the STA may immediately send the acknowledgment request after sending the data frame. The acknowledgment request includes indication information that instructs the AP 1 and the AP 2 to separately reply to the acknowledgment request. For example, as shown in FIG. 6, after sending the data frame A-MPDU 3, the STA immediately sends a multi-user block request MU-BAR. Herein, an RA field of the MU-BAR is set to a broadcast address, and the MU-BAR includes two pieces of User Info that are used to instruct the AP 1 and the AP 2 to separately reply to the acknowledgment request. After receiving the MU-BAR frame, the AP 1 and the AP 2 separately reply with a BA frame after an SIFS based on the reception statuses. It should be understood that the multi-user block request MU-BAR and the data frame A-MPDU 1-3 may be alternatively aggregated into one frame. This is not limited in this embodiment of this application. It should be further understood that the method in this embodiment of this application is not limited to a single STA, and the method in this embodiment of this application may be further applicable to a multi-STA multi-AP communication scenario. An uplink data frame joint reception method for each STA and a plurality of APs in the multi-STA multi-AP scenario is the same as an uplink data frame joint reception method for a single STA and a plurality of APs shown in FIG. 6. Details are not described herein again.

The embodiments of this application further provide data acknowledgment apparatuses, including a STA-side data acknowledgment apparatus and an AP-side data acknowledgment apparatus. It should be understood that the STA-side data acknowledgment apparatus has any function of the STA in the foregoing methods, and the AP-side data acknowledgment apparatus has any function of the AP in the foregoing methods.

Figure 7:
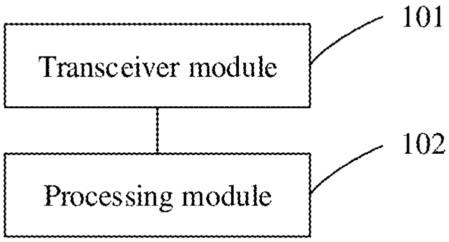
FIG. 7 shows a structure of a data acknowledgment apparatus according to some embodiments of this application.

FIG. 7 shows structures of the data acknowledgment apparatuses according to the embodiments of this application, including a structure of the STA-side data acknowledgment apparatus and a structure of the AP-side data acknowledgment apparatus.

As shown in FIG. 7, an embodiment of this application provides a STA-side data acknowledgment apparatus, including:

- a sending module 101, configured to send a data frame, where
- the sending module 101 is further configured to send an acknowledgment request; and
- a processing module, configured to control the sending module to send the acknowledgment request after X duration from end of sending the data frame, where the X duration is greater than or equal to a transmission delay on a backhaul link between APs, and the acknowledgment request is an acknowledgment request for the data frame, and the indication information includes an RA field whose value is a MAC address of a virtual coordinated AP and that is in the data frame, or a 1-bit uplink joint reception indicator bit in the data frame.

The STA-side data acknowledgment apparatus further includes: a receiving module 101, configured to receive a beacon, where the beacon includes a MAC address of an AP, a MAC address of a virtual coordinated AP to which the AP belongs, and the transmission delay on the backhaul link between the APs.

Based on the STA-side data acknowledgment apparatus in this embodiment of this application, AP-side uplink joint reception can be completed without introducing data padding and wasting air interface resources.

As shown in FIG. 7, an embodiment of this application provides an AP-side data acknowledgment apparatus, including:

- a receiving module 101, configured to receive a data packet, where
- the receiving module 101 is further configured to receive an acknowledgment request; and
- a processing module, configured to control the receiving module to receive the acknowledgment request after X duration from end of receiving the data frame, where the X duration is greater than or equal to a transmission delay on a backhaul link between APs, and the acknowledgment request is an acknowledgment request for the data frame; and the AP-side data acknowledgment apparatus further includes: a sending module, configured to reply to the acknowledgment request.

The data frame carries indication information used to indicate uplink joint reception. The indication information includes an RA field whose value is a MAC address of a virtual coordinated AP and that is in the data frame, or a 1-bit uplink joint reception indicator bit in the data frame.

The sending module 101 is further configured to send a beacon, where the beacon includes a MAC address of an AP, a MAC address of a virtual coordinated AP to which the AP belongs, and the transmission delay on the backhaul link between the APs.

Based on the AP-side data acknowledgment apparatus in this embodiment of this application, AP-side uplink joint reception can be completed without introducing data padding and wasting air interface resources.

The data acknowledgment apparatuses provided in the embodiments of this application include the STA-side data acknowledgment apparatus and the AP-side data acknowledgment apparatus, and may be implemented in a plurality of product forms. For example, the data acknowledgment apparatus may be configured as a general processing system. For example, the data acknowledgment apparatus may be implemented by a general bus architecture. For example, the data acknowledgment apparatus may be implemented by an application-specific integrated circuit (ASIC), and the like. The following provides several possible product forms of the data acknowledgment apparatus in the embodiments of this application. It should be understood that the following is merely an example, and the possible product forms in the embodiments of this application are not limited thereto.

Figure 8:
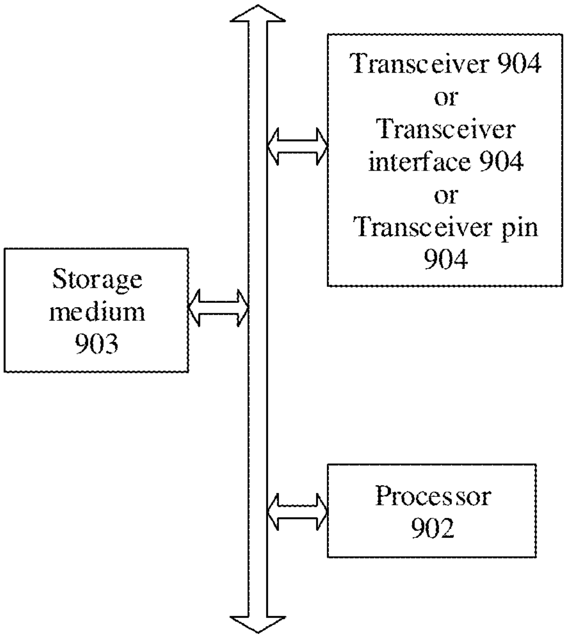
FIG. 8 is a structural diagram of a possible product form of a data acknowledgment apparatus according to some embodiments of this application.

FIG. 8 is a structural diagram of possible product forms of the data acknowledgment apparatus according to an embodiment of this application.

In a possible product form, the data acknowledgment apparatus may be a data acknowledgment device, and the data acknowledgment device includes a processor 902 and a transceiver 904. In some embodiments, the data acknowledgment apparatus may further include a storage medium 903.

In another possible product form, the data acknowledgment apparatus may be a data acknowledgment board, and the data acknowledgment board includes a processor 902 and a transceiver 904/transceiver interface 904. In some embodiments, the data acknowledgment apparatus may further include a storage medium 903.

In another possible product form, the data acknowledgment apparatus is also implemented by a processor, that is, implemented by a chip. The general purpose processor includes a processor 902 and a transceiver interface 904/transceiver pin 904. In some embodiments, the processor may further include a storage medium 903.

In another possible product form, the data acknowledgment apparatus may also be implemented by using the following components: one or more field programmable gate arrays (FPGAs), a programmable logic device (PLD), a controller, a state machine, a gate logic, a discrete hardware component, any other suitable circuit, or any combination of circuits that can perform various functions described in this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and modules can be implemented by electronic hardware, computer software, or a combination thereof. To clearly describe the interchangeability between the hardware and the software, the foregoing has generally described steps and composition of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, reference can be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely used as an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communications connections may be implemented by using some interfaces. Indirect couplings or communications connections between the apparatuses or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions in the embodiments of this application.

In addition, functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or portions thereof, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

The invention claimed is:

1. A station (STA)-side data acknowledgment apparatus, comprising:

a transmitter configured to send a data frame to access points (APs), and to send an acknowledgment request;

a processor configured to control the transmitter to send the acknowledgment request after a duration from an end of sending the data frame to the APs, wherein the duration is greater than or equal to a transmission delay on a backhaul link between the APs, and the acknowledgment request is an acknowledgment request for the data frame; and receiver configured to receive a beacon, wherein the beacon comprises a media access control (MAC) address of an AP, a MAC address of a virtual coordinated AP to which the AP belongs, and the transmission delay on the backhaul link between the APs, wherein the data frame includes indication information useable to indicate uplink joint reception, and the indication information comprises a receiver address (RA) field whose value is a MAC address of a virtual coordinated AP and is in the data frame, or a 1-bit uplink joint reception indicator bit in the data frame.

2. An access point (AP)-side data acknowledgment apparatus, comprising:

a receiver configured to receive a data frame from a station (STA), and to receive an acknowledgment request from the STA; and a processor configured to control the receiver to receive the acknowledgment request after a duration from an end of receiving the data frame from the STA, wherein the duration is greater than or equal to a transmission delay on a backhaul link between APs, and the acknowledgment request is an acknowledgment request for the data frame; and a transmitter configured to reply to the acknowledgment request, and to send a beacon, wherein the beacon comprises a media access control (MAC) address of an AP, a MAC address of a virtual coordinated AP to which the AP belongs, and the transmission delay on the backhaul link between the APs, wherein the data frame includes indication information useable to indicate uplink joint reception, and the indication information comprises a receiver address (RA) field whose value is a MAC address of a virtual coordinated AP and is in the data frame, or a 1-bit uplink joint reception indicator bit in the data frame, and wherein the receiver is further configured to receive a data frame by the AP in response to the MAC address of the virtual coordinated AP being the MAC address of the virtual coordinated AP to which the AP belongs.

3. The AP-side data acknowledgment apparatus according to claim 2, wherein the value of the RA field in the data frame is the MAC address of the virtual coordinated AP, and the AP determines whether the MAC address of the virtual coordinated AP is the MAC address of the virtual coordinated AP to which the AP belongs.

4. The AP-side data acknowledgment apparatus according to claim 2, wherein the data frame includes the 1-bit uplink joint reception indication bit, and the AP determines whether to receive the data frame according to an uplink joint reception policy of the AP.

5. The AP-side data acknowledgment apparatus according to claim 2, wherein the STA continuously sends data frames, and in response to replying to the acknowledgement request the AP:

replies to a reception status of the data frame in response to a duration between receiving the data frame by the AP and receiving the acknowledgment request by the AP being greater than or equal to the transmission delay on the backhaul link between the APs; or fails to reply to the reception status of the data frame in response to the duration between receiving the data frame by the AP and receiving the acknowledgment request by the AP is less than the transmission delay on the backhaul link between the APs.

6. The AP-side data acknowledgment apparatus according to claim 2, wherein the transmitter is further configured to send the beacon in a broadcast manner.

7. A data acknowledgment method, comprising:

sending, by a station (STA), a data frame to access points (APs); and sending, by the STA, an acknowledgment request after a duration from an end of sending the data frame to the APs, wherein the duration is greater than or equal to a transmission delay on a backhaul link between the APs, and the acknowledgment request is an acknowledgment request for the data frame, wherein before the sending, by the STA, the data frame, the method further comprises:

receiving, by the STA, a beacon, wherein the beacon comprises a media access control (MAC) address of an AP, a MAC address of a virtual coordinated AP to which the AP belongs, and the transmission delay on the backhaul link between the APs, wherein the data frame includes indication information useable to indicate uplink joint reception, and the indication information comprises a receiver address (RA) field whose value is a MAC address of a virtual coordinated AP and is in the data frame, or a 1-bit uplink joint reception indicator bit in the data frame, and the method further comprises:

determining, by the APs, based on indication information in the received data frame whether to receive the data frame, wherein the data frame is received, by the AP, in response to the MAC address of the virtual coordinated AP being the MAC address of the virtual coordinated AP to which the AP belongs.

8. The method according to claim 7, further comprising:

receiving, by an AP, a data frame; and receiving, by the AP, an acknowledgment request after a duration from an end of receiving the data frame, wherein the duration is greater than or equal to the transmission delay on the backhaul link between the APs.

9. The method according to claim 8, wherein after the receiving, by the AP, the acknowledgment request, the method further comprises:

replying, by the AP, to the acknowledgment request.

10. The method according to claim 9, wherein the STA continuously sends data frames, and in response to replying to the acknowledgement request the AP:

replies to a reception status of the data frame in response to a duration between receiving the data frame by the AP and receiving the acknowledgment request by the AP being greater than or equal to the transmission delay on the backhaul link between the APs; or fails to reply to the reception status of the data frame in response to the duration between receiving the data frame by the AP and receiving the acknowledgment request by the AP is less than the transmission delay on the backhaul link between the APs.

11. The method according to claim 8, wherein before the receiving, by the AP, the data frame, the method further comprises:

sending, by the AP, the beacon.

12. The method according to claim 8, wherein the value of the RA field in the data frame is the MAC address of the virtual coordinated AP, and the AP determines whether the MAC address of the virtual coordinated AP is the MAC address of the virtual coordinated AP to which the AP belongs.

13. The method according to claim 8, wherein the data frame includes the 1-bit uplink joint reception indication bit, and the AP determines whether to receive the data frame according to an uplink joint reception policy of the AP.

* * * * *